United States Patent [19]

Metzger

[11] Patent Number: 5,023,057
[45] Date of Patent: Jun. 11, 1991

[54] APPARATUS FOR THE PREPARATION OF CARBON POLYMONOFLUORIDE

[75] Inventor: Jean Metzger, Pierre Benite, France

[73] Assignee: Societe Atochem, Puteaux, France

[21] Appl. No.: 321,082

[22] Filed: Mar. 9, 1989

Related U.S. Application Data

[62] Division of Ser. No. 136,941, Dec. 23, 1987, Pat. No. 4,855,121.

[30] Foreign Application Priority Data

Jan. 5, 1987 [FR] France .................................. 87 00015

[51] Int. Cl.⁵ ................................................ B01J 8/00
[52] U.S. Cl. .................................... 422/202; 422/209; 422/232; 422/233
[58] Field of Search ................. 422/202, 209, 232, 233

[56] References Cited

U.S. PATENT DOCUMENTS

| Re. 30,667 | 7/1981 | Watanabe et al. | |
|---|---|---|---|
| 2,071,534 | 2/1937 | Ingraham | 422/209 |
| 2,633,477 | 3/1953 | Rollman | 422/209 |
| 2,638,625 | 5/1953 | Studebaker et al. | 422/209 |
| 2,835,554 | 5/1958 | Pardee | 422/209 |
| 2,969,277 | 1/1961 | Carlson et al. | 422/209 |
| 3,872,032 | 3/1975 | Kanemaru et al. | |
| 3,904,501 | 9/1975 | Lagaw et al. | |
| 3,929,920 | 12/1975 | Kemo et al. | |
| 4,255,389 | 3/1981 | Jung et al. | 422/233 |
| 4,304,755 | 12/1981 | Thome et al. | 422/232 |
| 4,362,701 | 12/1982 | Kruger et al. | 422/209 |
| 4,816,225 | 3/1989 | Mathur et al. | 422/209 |

FOREIGN PATENT DOCUMENTS

| 1386000 | 12/1964 | France . |
|---|---|---|
| 2126595 | 9/1972 | France . |
| 59-184716 | 10/1984 | Japan . |
| 2104883 | 3/1983 | United Kingdom . |
| 2104884A | 3/1983 | United Kingdom . |
| 2106882 | 4/1983 | United Kingdom . |

Primary Examiner—Peter Kratz
Attorney, Agent, or Firm—Morgan & Finnegan

[57] ABSTRACT

This invention relates to apparatus for the preparation of carbon polymonofluoride.

The reaction of fluorine diluted with at least one inert gas with carbon particles is performed in a reaction zone in which the particles travel as a thin layer. Diluted fluorine is introduced into the reaction zone in the form of a plurality of gaseous mixtures delivered at a plurality of points close to the layer of the particles and distributed in the reaction zone. The weight content of fluorine and the flow rate of each of the gaseous mixtures are controlled independently and such that the volume content of fluorine in the gaseous phase at the gaseous phase/particles interface in the vicinity of each of the points is lower than the minimum content causing the inflammation of the particles.

For a space time output higher than 10 kg·h$^{-1}$ m$^{-3}$, the process permits a fluorine yield higher than 50% and capable of exceeding 60% to be obtained in the absence of recycling of the gases originating from the reaction zone.

11 Claims, 1 Drawing Sheet

APPARATUS FOR THE PREPARATION OF CARBON POLYMONOFLUORIDE

This is a Division of application Ser. No. 136,941 filed Dec. 23, 1987 now U.S. Pat. No. 4,855,121.

FIELD OF THE INVENTION

The present invention relates to a continuous process for the preparation of carbon polymonofluoride by reaction of fluorine diluted with at least one inert gas with carbon particles. It also relates to an apparatus for putting the process into practice.

BACKGROUND OF THE INVENTION

The reaction between carbon and fluorine makes it possible to obtain, in particular, solid compounds called carbon polyfluorides of general formula $(CF_x)_n$ in which x is a number whose average value is between 0 and 1.25 and n is an integer greater than 1.

In the present description "carbon polymonofluoride" means a carbon polyfluoride of general formula $(CF_x)_n$ in which x is a number whose average value is between 0.8 and 1.25.

Although the original work on carbon fluorination goes back to H. MOISSAN, the preparation of a product of defined composition is the work of O. RUFF, O. BRETSCHNEIDER and F. EBERT (Z. anorg. all-gem, Chem. 217, 1, 1934). The conditions of preparation, the structure, the properties and the conditions of utilization of graphite carbon polyfluoride are described by N. WATANABE, and T. NAKAJIMA, in *Preparation and Properties of Organofluorine Compounds*, R. E. BANKS, page 297, chapter 9—John Wiley—1982.

The following chemical equations express the main reactions which can take place between carbon and fluorine:

(1) total fluorination of carbon:

$$C + 2F_2 \rightarrow CF_4$$

(2) controlled fluorination of carbon:

$$n(2C + F_2) \rightarrow 2(CF)_n$$

$$n(4C + F_2) \rightarrow 2(C_2F)_n$$

(3) fluorination of carbon polyfluoride:

$$2(CF)_n + 3nF_2 \rightarrow 2nCF_4$$

(4) thermal decomposition of carbon polyfluoride:

$$4(CF)_n \rightarrow 3nC + nCF_4$$

Taken as a group, these reactions constitute a highly exothermic system. This is why many authors have applied themselves to a better control of the different reactions with the aim of improving the yield of formation of carbon polyfluoride.

In particular, investigations of the kinetics of carbon fluorination have been published (N. WATANABE, M. TAKASHIMA, Kogy Kagaku Zasshi, 74, 1788, 1971).

Numerous patents describe processes aimed at improving the course of the carbon-fluorine reaction by means of modifications of the operating conditions such as:

preactivation of carbon with ammonia, steam, hydrofluoric acid, fluorine when cold, sulphuric acid or by means of heat treatment, strict control of the carbon particle size, addition of additives to the gaseous phase (oxygen, carbon dioxide, hydrofluoric acid, carbon tetrafluoride, gaseous fluorocarbons, sulphur hexafluoride), and addition of additives to the solid phase such as metallic fluorides like alumina fluoride and carbon polyfluoride.

Because of the difficulties encounted in controlling the reaction, non-continuous processes were essentially used until 1979. Now, any non-continuous process presents the following disadvantages:

poor removal of heat from within the carbon-containing material, whose thermal conductivity is low. (This results in poor control of the reaction temperature, which can give rise to runaways and cause uncontrolled inflammations leading to undesirable by-products.), limitation of the reaction rate by the intergranular diffusion of fluorine, which leads to high residence times in the reaction zone and consequently to a low space time output, and numerous and costly handling operations.

As a result, a number of authors have attempted to prepare carbon polyfluoride by means of a continuous process.

French Patent Application No. 80/06,889, published under No. 2,452,473 discloses a continuous process for fluorination of carbon particles in an apparatus consisting of a horizontal reactor subjected to vibrations and provided, at the two ends of the reactor, with orifices for feeding and orifices for removing solid material and orifices for feeding and orifices for removing the reactive gas.

However, this process, as described, presents the disadvantage of difficult reaction control, owing to the inflammations of the carbon particles which generally occur. This is detrimental to the quality of the product obtained. Furthermore, the apparatus such as described, contains a high proportion of useless space. This does not permit a high space time production rate and a high fluorine yield to be obtained at the same time. Thus for a space time production rate P of the order of 10 $kg \cdot h^{-1} m^{-3}$, a space time production rate considered to be the best possible in the present state of the art, it is not possible to obtain a fluorine yield higher than 25%.

The space time production rate P and the fluorine yield Y of a continuous process for the preparation of carbon polymonofluoride are defined as:

$$P = \frac{\text{Flow rate by weight of carbon polymonofluoride}}{\text{Volume of the reaction zone}}$$

$$Y = \frac{\text{Quantity of fluorine converted into carbon polymonofluoride}}{\text{Quantity of fluorine introduced into the reaction zone}} \times 100$$

The process which is the subject of the invention does not present the above mentioned disadvantage. For a space time production rate P higher than 10 $kg \cdot h^{-1} m^{-3}$, it permits a fluorine yield Y higher than 50%, capable of exceeding 60%, to be obtained in the absence of recycling of the gases originating from the reaction zone. Considering the high fluorine concentration at all points of the gaseous phase/particles interface, it is completely surprising to obtain a fluorine yield Y as high as this. Whereas, a preferential and high formation of fluorine-rich fluorocarbon compounds such as carbon tetrafluoride could be expected.

SUMMARY OF THE INVENTION

According to the process of the invention, the reaction of fluorine diluted with at least one inert gas with carbon particles is performed in a reaction zone in which the particles travel as a thin layer, while the diluted fluorine and the particles are similtaneously continuously introduced into the reaction zone. The reaction zone is maintained at the selected temperature. While the carbon polymonofluoride is formed, the reaction gases and the unreacted gases are continuously removed from the reaction zone.

DETAILED DESCRIPTION OF THE PROCESS

According to the process of the invention, the diluted fluorine is introduced into the reaction zone in the form of a plurality of gaseous mixtures delivered at a plurality of points close to the layer of the particles and distributed in the reaction zone. The volume content of fluorine and the flow rate of each of the gaseous mixtures are controlled independently and such that the volume content of fluorine in the gaseous phase at the gaseous phase/particles interface in the vicinity of each of the points is lower than the minimum content causing inflammation of the particles.

In the present description, "close" to the layer of particles means at a distance from the layer which is between 0.5 and 10 cm and preferably between 0.5 and 1.5 cm.

Nitrogen or helium and/or a part of the gases originating from the reaction zone may, for example, be used as inert gas.

To put into practice the process of the invention, the volume content of fluorine in each of the gases mixtures is such that the absolute difference between the volume content of fluorine in the gaseous phase at the gaseous phase/particles interface in the vicinity of each of the points and the minimum content causing the inflammation of the particles is generally between 1 and 10%.

The flow rate of fluorine in each of the gaseous mixtures is generally between 0.75 and 1.25 times the flow rate equal to the quotient of the total flow rate of fluorine divided by the number of points of delivery of the gaseous mixtures.

The total flow rate of the gaseous mixtures delivered at all the points is preferably sufficiently low not to cause an entrainment in the gases discharged, of a quantity of carbon polymonofluoride which is greater than 10% by weight relative to the carbon polymonofluoride formed.

Applicant has found that when the diluted fluorine is introduced into the reaction zone in the form of a single gaseous mixture delivered at a single point close to the layer of the particles and when the volume content of fluorine in the gaseous mixture is progressively increased, an inflammation of the particles takes place in the vicinity of the point, when the content attains a certain critical value. This inflammation is discerned by the observation of a sudden rise in temperature in the vicinity of the point. Temperature is indicated by a thermocouple immersed in the layer of the particles in the vicinity of the point. By way of indication, in the case of graphite particles, the critical value is approximately 20% at a temperature of 500° C.

Applicant has also found that when the volume content of fluorine in the gaseous mixture delivered at a single point is lower than the critical value, no inflammation takes place. However, to obtain carbon polyfluoride of formula $(CF_x)_n$ in which the average value of x is higher than 0.8, one or the other of the following disadvantages is encountered. Long residence times, which may be longer than 20 hours, of the particles in the reaction zone are necessary. This is detrimental to the space time production rate of the process. Very high flow rates of the gaseous mixture are also necessary. This is detrimental to the fluorine yield of the process and causes considerable entrainment of the finest particles with the discharged gases.

Applicant has found also that by introducing diluted fluorine into the reaction zone in the form of a plurality of gaseous mixtures at a plurality of points close to the layer of the particles and distributed in the reaction zone and by controlling the volume content of fluorine and the flow rate of each of the gaseous mixtures independently and such that the volume content of fluorine in the gaseous phase at the gaseous phase/particles interface in the vicinity of each of the points is lower than the minimum content causing the inflammation of the said particles, it is possible to obtain a carbon polyfluoride of formula $(CF_x)_n$. The average value of x may be, at will, any value between 0.8 and 1.25. Residence times of the particles in the reaction zone are shorter. Lower flow rates of gaseous mixtures permit a higher yield to be attained without causing major entrainment of the finest particles with the discharged gases.

The number of points of delivery of the gaseous mixtures depends essentially on the surface area of the layer of particles. With everything else being equal, it is proportionately higher the higher the surface area, and it is generally between 10 and 75 per m².

Any type of carbon-containing material may be used according to the invention. It may be amorphous or crystalline, for example, natural graphite, artificial graphite, petroleum coke, carbon black, active charcoal and activated carbon. The process of the invention applies to carbon particles of a diameter which is generally between 20 and 400 μm.

To prepare the diluted fluorine, pure fluorine of any origin may in practice be used. It is possible, for example, to use a fluorine obtained by conventional electrolysis of a mixture of potassium fluoride and hydrofluoric acid or a commercially available refined fluorine.

The maximum thickness of the layer of particles, which must not be too large so that all the particles take part homogeneously in the fluorination, is generally between about 0.5 and 5 cm.

The average speed of forward travel of the particles in the reaction zone is advantageously between about 5 and 50 cm/h. The forward travel of the particles is obtained by a simple conventional means such as, for example, mechanical means (belt conveyor, rotary reactor) or electromagnetic means (vibrating conveyor).

The quantity of fluorine to be used is such that the molar ratio of fluorine to carbon is generally between about 1.3 and 2 times the average value of the number x in the formula $(CF_x)_n$ of the carbon polymonofluoride to be prepared.

The removal of the reaction gases and of the gases which have not reacted, from the reaction zone, may take place in the direction of forward travel of the particles or, preferably, counter-currentwise to the direction of forward travel.

As long as these conditions of introduction of the particles and of the diluted fluorine are satisfied the fluorine content of the fluorinated carbon is proportionately, larger the longer the average residence time of the particles in the reaction zone. The average residence time is generally between about 7 and 20 hours.

The reaction temperature, which is a function of the type of carbon-containing material used, is generally between 200° and 600° C. and preferably between 350° and 550° C. It is preferably between 350° and 500° C. for amorphous carbons and between 400° and 550° C. for crystalized carbons.

During the fluorination, the absolute pressure in the reaction zone is atmospheric pressure or a slightly higher pressure not exceeding 150 kPa.

The carbon polymonofluoride, extracted continuously, is freed from unreacted fluorine and from the hydrofluoric acid formed which it contains by any known means. For example, the means includes use of vacuum, or passing an unreactive gas such as air through the particles, or by heat treatment.

The gases originating from the reaction zone and comprising fluorine, hydrofluoric acid, fluorinated hydrocarbons and inert gas, may be partially recycled. Preferably, this occurs after separation of the entrained particles of carbon polyfluoride.

Any kind of reactor in which the particles travel as a thin layer may be used for putting the process of the invention into practice. A rotary reactor with a substantially horizontal axis is advantageous.

A rotary reactor with a "substantially horizontal" axis means, according to the invention, is a rotary reactor in which the inclination of the axis relative to the horizontal is zero or not exceeding 5 degrees.

An apparatus which permits, according to the process of the invention, carbon particles and fluorine diluted with at least one inert gas to be continuously reacted comprises a reactor in which the particles travel as a thin layer, on a surface carrying, from one end of the reactor to the other, a device for feeding the reactor with diluted fluorine, a device for feeding the reactor with particles, a device for discharging the particles, a tube for discharging the reaction gases and the unreacted gases, means for heating and means for cooling the reactor.

The device for feeding diluted fluorine comprises means for introducing the diluted fluorine into the reactor in the form of a plurality of gaseous mixtures, means for delivering the gaseous mixtures at a plurality of points distributed inside the reactor, at a distance which is generally between 1 and 15 cm from the carrying surface and means for controlling, independently the flow rates of fluorine and of inert gas in each of the gaseous mixtures.

Any apparatus corresponding to these characteristics may be used.

The device for feeding the reactor with diluted fluorine generally comprises a plurality of independent feed conduits, each connected upstream to two other, adjustable-flow conduits, fed with fluorine and inert gas respectively. In general, each of the conduits which deliver the gaseous mixtures of fluorine and of inert gas terminates in a tube, inclined to the horizontal, whose lower end opens at one of the points.

The device for feeding particles and the tube for removing the reaction gases and the gases which have not reacted may be placed one at one end and the other at the other end, or, preferably, at the same end of the reactor.

The device for removing the particles is placed at the end away from that at which the device for feeding the particles is placed.

Among the types of apparatus capable of being used, preference is given to those comprising, as reactor, a rotary reactor with a substantially horizontal axis. If the axis of the rotary reactor is inclined relative to the horizontal, the device for feeding particles is placed at the higher end of the reactor.

For the rotary reactor with a substantially horizontal axis, the carrying surface is formed by the internal side wall of the reactor. The points of delivery of the gaseous mixtures are situated in the lower part of the reactor, at an angular distance from the vertical plane passing through the reactor axis which is preferably between +10 and +45 degrees. The angular distance is taken as positive in the direction of rotation of the reactor.

At each end, the internal side wall of the reactor advantageously comprises a crown-shaped overflow permitting the maximum thickness of the layer of particles to be maintained in the reactor at a determined value. The height of the overflow, all else being equal, determines the quantity of particles present in the reaction zone and consequently the average residence time of the particles in the reaction zone. The relative height of each of the overflows is fixed so as to permit the particles to travel forward in the intended direction. Account is taken of any angle of inclination of the reactor axis relative to the horizontal.

The speed of rotation of the reactor is such that the linear speed of the side wall is generally between 1 and 6 m/min.

A non-limiting example of an apparatus according to the invention comprising a rotary reactor with a horizontal axis is given below with reference to FIGS. 1 and 2 of the single plate of drawing attached herewith.

DETAILED DESCRIPTION OF APPARATUS

Figure 1:
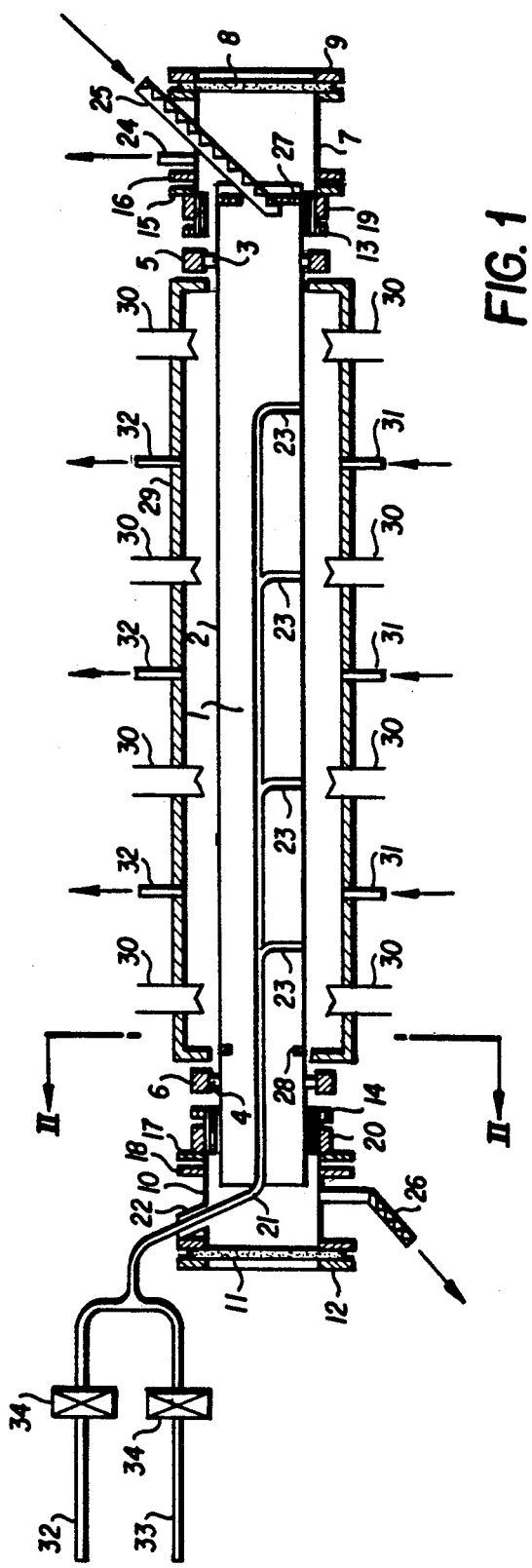
FIG. 1 is a diagrammatic sectional view of the apparatus.

The apparatus comprises a rotary reactor 1 which has an internal, cylinder of revolution, side wall 2 mounted on rotary rollers 3 and 4 which are associated with the supports 5 and 6 respectively, rotating around its axis. At one end, the reactor 1 is closed by a fixed wall 7 equipped with a bursting disc 8 held by a flange 9. At the other end, the reactor is closed by a fixed wall 10 equipped with a bursting disc 11 held by a flange 12. The side wall 2 of the reactor 1 is supported by the bearings 13 and 14. The bearing 13 is connected to the fixed wall 7 by the flanges 15 and 16. The bearing 14 is connected to the fixed wall 10 by the flanges 17 and 18. Sealing between the side wall 2 and the fixed walls 7 and 10 is provided by means of the stuff joints 19 and 20, respectively.

The device for feeding the reactor 1 with diluted fluorine comprises four independent feed conduits such as 21 entering the reactor through the tube 22 arranged on the fixed wall 10 of the reactor 1, each connected upstream to two conduits 32 and 33 fed with fluorine and inert gas respectively and fitted with flow regulators 34. Each of the conduits 21, four in number, which deliver the gaseous mixture of fluorine and of inert gas terminates in a tube inclined to the horizontal such as 23 whose lower end opens at a point close to the internal side wall 2 of the reactor 1. The tubes 23 are distributed inside the reactor 1.

A tube 24 for removing the reaction gases and the gases which have not reacted is arranged on the fixed wall 7.

The device for feeding 25 the reactor 1 with carbon particles opens into the reactor 1, through the fixed wall 7.

The device for removing 26 particles of carbon polymonofluoride from the reactor is placed on the fixed wall 10.

On its inner side wall 2, the reactor 1 comprises two crown-shaped overflows, one 27 at the end at which the device for feeding 25 carbon particles is placed and the other, 28, at the end at which the device for removing 26 the particles of carbon polymonofluoride is placed.

The central part of the reactor 1 is placed in a lagged, cylinder of revolution, enclosure 29 whose axis is the reactor axis, and on the inner wall of which are fastened electrical resistances such as 30. In the space which remains between the enclosure 29 and the side wall 2 of the reactor 1, a heat exchange fluid, such as air, can circulate, entering via tubes such as 31 and leaving via tubes such as 32. Thermocouples (not shown) entering the reactor 1 via the tube 22 have their ends in the vicinity of the side wall 2.

Figure 2:
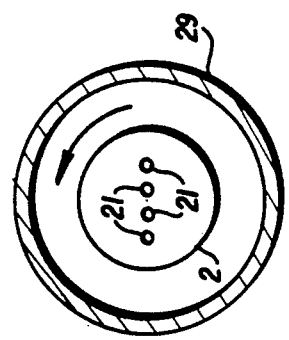
FIG. 2 is a view in section along the line II—II of FIG. 1.

When the apparatus described above and shown in FIGS. 1 and 2 is used, the operation of the process is as follows. The speed of rotation of the reactor 1 is set at the chosen value. Particles of a carbon-containing material are fed continuously into the reactor 1 by the feeding device 25. The carbon-containing material is heated to the chosen temperature by the electrical resistances 30. The gaseous mixtures of fluorine and of inert gas are introduced into the reactor 1 via the conduits 21 in which they are heated to the reaction temperature. The temperature of the layer of particles is then maintained at the chosen value by circulation of cooling air in the space provided for this purpose. Air enters via tubes such as 31 and leaves via tubes such as 32. The carbon monofluoride particles formed are removed by the removal device 26, while the reaction gases and the gases which have not reacted are removed via the tube 24.

EXAMPLES

Non-limiting examples of embodiments of the process of the invention are given below:

Examples 1, 3 and 4 are given by way of comparison.
Examples 2 and 5 are according to the invention.

EXAMPLES 1, 3 AND 4

The apparatus is that described above and shown in FIGS. 1 and 2, except that the device for feeding the reactor with gaseous mixture comprises a single conduit.

EXAMPLES 2 AND 5

The apparatus is that described above and shown in FIGS. 1 and 2.

The side wall of the reactor has a working length L corresponding to the length of the lagged enclosure bounding the reaction zone, 180 cm, and an internal diameter of 18 cm. The reactor is inclined at an angle of 3 degrees relative to the horizontal and its speed of rotation is 3 rev/min.

According to Examples 2, 4 and 5, the gaseous mixtures, four in number, are delivered at points designated by point 1, point 2, point 3 and point 4, situated at 65, 110, 155 and 180 cm, respectively, from the end of the lagged enclosure which is at the side of the device for feeding particles, 5 cm from the inner side wall of the reactor and at an angular distance of +18 degrees from the vertical plane passing through the reactor axis. The angular distance is taken as positive in the direction of rotation of the reactor.

According to Example 1 and 3, the gaseous mixture is single and is delivered at point 4.

The maximum thickness of the layer of particles is equal to the length of the sagitta corresponding to the segment of a circle represented by the section of maximum area through a plane perpendicular to the axis of the reactor, of the volume occupied by the particles at zero speed of rotation.

In all the examples, the maximum thickness of the layer of particles, at zero speed of rotation, is 4 cm.

In the examples according to the invention, the number of points of delivery of the gaseous mixtures per m$^2$ of surface area of the layer of particles is 14.8.

In all the examples, the flow rate of fluorine in each of the gaseous mixtures is equal to the quotient of the total flow rate of fluorine divided by the number of points of delivery of the gaseous mixtures. The absolute pressure in the reaction zone is 110 kPa.

In the examples according to the invention, the quantity of carbon polymonofluoride entrained with the gases originating from the reaction zone, in weight relative to the carbon polymonofluoride formed, is smaller than 10%.

Table 1 shows, for each example:
the nature and the average diameter of the carbon particles,
the flow rate of the carbon particles,
the total flow rate of fluorine,
the volume content of fluorine in the gaseous mixtures at each of points 1, 2, 3, and 4,
the temperature indicated by the thermocouples at each of the points 1, 2, 3 and 4,
the average residence time of the particles in the reaction zone,
the average speed of forward travel of the particles,
the flow rate of $(CF_x)_n$ collected,
the average value of x in the $(CF_x)_n$ collected,
the space time production rate P, and
the fluorine yield Y, in the absence of recycling of the gases originating from the reaction zone.

TABLE 1

| | EXAMPLES | | | | |
|---|---|---|---|---|---|
| | 1 | 2 | 3 | 4 | 5 |
| Nature of the carbon | graphite | graphite | coke | coke | coke |
| Average diameter of the carbon particles (μm) | 150 | 150 | 150 | 150 | 150 |
| Flow rate of the carbon particles (g/h) | 89 | 215 | 240 | 240 | 250 |
| Total flow rate of fluorine (l/h STP*) | 147 | 272 | 226 | 346 | 305 |

TABLE 1-continued

|  | EXAMPLES | | | | |
|---|---|---|---|---|---|
|  | 1 | 2 | 3 | 4 | 5 |
| Volume content of fluorine (%) | | | | | |
| point 1 | — | 33 | — | 39 | 40 |
| point 2 | — | 33 | — | 39 | 40 |
| point 3 | — | 23 | — | 27 | 29 |
| point 4 | 18 | 18 | 16 | 21 | 18 |
| Temperature (°C.) | | | | | |
| point 1 | 535 | 470 | 460 | 460 | 460 |
| point 2 | 480 | 490 | 460 | 460 | 460 |
| point 3 | 470 | 490 | 460 | 460 | 460 |
| point 4 | 495 | 480 | 460 | 460 | 460 |
| Average residence time of the particles (h) | 21 | 10 | 11 | 11 | 7 |
| Average speed of forward movement of the particles (cm/h) | 8.6 | 18 | 16.4 | 16.4 | 25.7 |
| Flow rate of $(CF_x)_n$ (g/h) | 204 | 486 | 405 | — | 485 |
| Average value of x | 0.95 | 0.91 | 0.66 | 0.98 | 0.90 |
| Space time production rate P (kg $h^{-1}$ $m^{-3}$) | 4.5 | 10.6 | 8.9 | — | 10.6 |
| Fluorine yield Y (%) | 49 | 62 | 54 | — | 55 |

*"STP" means that the volume of the gas in question is referred to standard temperature and pressure conditions: 0° C. and 101,325 Pa.

In Comparative Example 1, with a space time production rate, P well below 10 kg·h$^{-1}$ m$^{-3}$, the fluorine yield Y does not reach 50%.

In Comparative Example 3, the $(CF_x)_n$ collected is not carbon polymonofluoride. The mean value of x is not between 0.8 and 1.25.

In Comparative Example 4, the volume content of fluorine at the gaseous phase/particles interface in the vicinity of point 4 (a content which, in the case of this point, is equal to the volume content of fluorine at the point) is higher than the critical value of 20%. The example shows that after 18 hours operation inflammation of the carbon particles takes place in the vicinity of point 4, which makes it necessary to stop the operation.

In Examples 2 and 5 according to the invention, at a space time production rate, P higher than 10 kg·h$^{-1}$ m$^{-3}$, the fluorine yield Y is higher than 50%. In Example 2, it exceeds 60%, and no inflammation of the carbon particles takes place during 30 days' continuous operation, the intended duration of the run.

Although the invention has been described inconjunction with specific embodiment, it is evident that many alternatives and variations will be apparent to those skilled in the art in light of the foregoing description. Accordingly, the invention is intended to embrace all of the alternatives and variations that fall within the spirit and scope of the appended claims.

I claim:

1. An apparatus for reactions involving contact between particles of carbon and fluorine diluted with at least one inert gas, comprising a reactor in which the particles travel as a thin layer, on a carrying surface, from one end of the reactor to the other, means by which to turn the reactor, a means for feeding the reactor with diluted fluorine, a means for feeding the reactor with particles, a means for removing the particles, a means for removing the reaction gases and the unreacted gases, heat exchange means for the reactor, the apparatus being characterized in that the means for feeding diluted fluorine comprises means for introducing the diluted fluorine into the reactor in the form of a plurality of gaseous mixtures, means for delivering the gaseous mixtures at a plurality of points distributed inside the reactor and means for independently controlling flow rates of fluorine and of inert gas in each of the gaseous mixtures.

2. The apparatus according to claim 1, wherein the points are at a distance of between 1 and 15 cm from the carrying surface.

3. The apparatus according to claim 1, wherein the means for feeding the reactor with diluted fluorine comprises a plurality of independent feed conduits each connected upstream to two other, controllable flow conduits, fed with fluorine and inert gas, respectively.

4. The apparatus according to claim 3, wherein each of the conduits ends in a tube, inclined to the horizontal, whose lower end opens at one of the points.

5. The apparatus according to claim 1, wherein the means for feeding particles and the means for removing the reaction gases and the unreacted gases are placed one at one end and the other at the other end of the reactor.

6. The apparatus according to claim 1, wherein the means for feeding particles and the means for removing the reaction gases and the unreacted gases are placed at the same end of the reactor.

7. The apparatus according to claim 1, wherein the means for removing the particles is placed at the end away from that at which the means for feeding particles is placed.

8. The apparatus according to claim 1, wherein the reactor is a rotary reactor with a substantially horizontal axis.

9. The apparatus according to claim 8, wherein the carrying surface includes the inner side wall of the reactor and the points of delivery of the gaseous mixtures are situated in the lower part of the reactor.

10. The apparatus according to claim 9, wherein the points of delivery of the gaseous mixtures are situated at an angular distance from the vertical plane passing through the reactor axis which is between +10 and +45 degrees, the angular distance being taken as positive in the direction of rotation of the reactor.

11. The apparatus according to claim 8, wherein the reactor includes a crown-shaped overflow at each end.

* * * * *